United States Patent
Takeuchi et al.

(10) Patent No.: US 12,053,884 B2
(45) Date of Patent: Aug. 6, 2024

(54) VIBRATION GENERATING DEVICE, CONTROL METHOD FOR VIBRATION GENERATING DEVICE, AND PICKUP SYSTEM

(71) Applicant: SEIKO EPSON CORPORATION, Tokyo (JP)

(72) Inventors: Takayuki Takeuchi, Matsumoto (JP); Takanori Suzuki, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 17/895,095

(22) Filed: Aug. 25, 2022

(65) Prior Publication Data
US 2023/0065097 A1 Mar. 2, 2023

(51) Int. Cl.
| | | |
|---|---|---|
| *B25J 9/00* | (2006.01) | |
| *B25J 9/12* | (2006.01) | |
| *B25J 9/16* | (2006.01) | |
| *B65G 27/20* | (2006.01) | |
| *B65G 27/32* | (2006.01) | |

(52) U.S. Cl.
CPC ............. *B25J 9/0096* (2013.01); *B25J 9/126* (2013.01); *B25J 9/1697* (2013.01); *B65G 27/20* (2013.01); *B65G 27/32* (2013.01)

(58) Field of Classification Search
CPC ........ B25J 9/0096; B25J 9/126; B25J 9/1697; B65G 27/16; B65G 27/20; B65G 27/32
USPC ................................. 198/758, 761, 762, 770
See application file for complete search history.

(56) References Cited

U.S. PATENT DOCUMENTS

| | | | | |
|---|---|---|---|---|
| 5,615,763 | A | 4/1997 | Schieber et al. | |
| 5,979,640 | A * | 11/1999 | Horton | B65G 27/32 198/752.1 |
| 6,145,652 | A * | 11/2000 | Durnil | B06B 1/166 198/770 |
| 6,598,734 | B1 * | 7/2003 | Rosenstrom | B65G 27/32 198/758 |
| 7,712,513 | B1 * | 5/2010 | Mitchell, III | B22D 29/005 198/771 |
| 10,569,304 | B2 * | 2/2020 | Bellec | B06B 1/161 |
| 11,046,528 | B2 * | 6/2021 | Olmstead | B65G 27/34 |
| 2019/0344311 | A1 | 11/2019 | Murphy | |

FOREIGN PATENT DOCUMENTS

| | | | |
|---|---|---|---|
| DE | 202016002239 U1 | 7/2016 | |
| JP | 3175501 U | 5/2012 | |
| WO | 3566784 | * 4/2019 | ............... B06B 1/16 |

* cited by examiner

*Primary Examiner* — James R Bidwell
(74) *Attorney, Agent, or Firm* — Samson G. Yu (57) ABSTRACT

A vibration generating device includes: a trough where a workpiece is placed; a first vibration motor and a second vibration motor whose rotary shafts are laid along a horizontal direction and parallel to each other; a transmission unit where the first vibration motor and the second vibration motor are arranged and that transmits a vibration of the first vibration motor and the second vibration motor to the trough; a first sensor detecting a rotating position of the rotary shaft of the first vibration motor; and a second sensor detecting a rotating position of the rotary shaft of the second vibration motor.

9 Claims, 11 Drawing Sheets

VIBRATION GENERATING DEVICE, CONTROL METHOD FOR VIBRATION GENERATING DEVICE, AND PICKUP SYSTEM

The present application is based on, and claims priority from JP Application Serial Number 2021-138678, filed Aug. 27, 2021, the disclosure of which is hereby incorporated by reference herein in its entirety.

BACKGROUND

1. Technical Field

The present disclosure relates to a vibration generating device, a control method for the vibration generating device, and a pickup system.

2. Related Art

Japanese Utility Model Registration No. 3,175,501 describes a vibratory conveyor device in which a conveyor trough supported by a plurality of spring legs is vibrated by a vibration motor so as to convey a powder or granular material. In such a vibratory conveyor device, the vibration motor is formed by two reference motors and one deflected motor. As the three vibration motors are individually controlled, a vibration in a predetermined direction can be generated in the conveyor trough.

However, the vibratory conveyor device of Japanese Utility Model Registration No. 3,175,501 has a problem in that the direction of vibration of the conveyor trough cannot be accurately controlled because the angle of eccentricity (position of eccentric weight) of the rotary shaft of each vibration motor is unknown.

SUMMARY

A vibration generating device according to an aspect of the present disclosure includes: a trough where a workpiece is placed; a first vibration motor and a second vibration motor whose rotary shafts are laid along a horizontal direction and parallel to each other; a transmission unit where the first vibration motor and the second vibration motor are arranged and that transmits a vibration of the first vibration motor and the second vibration motor to the trough; a first sensor detecting a rotating position of the rotary shaft of the first vibration motor; and a second sensor detecting a rotating position of the rotary shaft of the second vibration motor.

A control method according to another aspect of the present disclosure is a control method for a vibration generating device. The vibration generating device includes: a trough where a workpiece is placed; a first vibration motor and a second vibration motor whose rotary shafts are laid along a horizontal direction and parallel to each other; a transmission unit where the first vibration motor and the second vibration motor are arranged and that transmits a vibration of the first vibration motor and the second vibration motor to the trough; a first sensor detecting a rotating position of the rotary shaft of the first vibration motor; and a second sensor detecting a rotating position of the rotary shaft of the second vibration motor. The control method includes controlling driving of the first vibration motor and the second vibration motor, based on a result of detection by the first sensor and the second sensor.

A pickup system according to still another aspect of the present disclosure includes: a vibration generating device where a workpiece is placed and that applies a vibration to the workpiece and thus changes a position of the workpiece; a vision unit picking up an image of the workpiece placed in the vibration generating device and detecting the position of the workpiece, based on a result of image pickup; and a robot picking up the workpiece placed in the vibration generating device, based on a result of detection by the vision unit. The vibration generating device includes: a trough where the workpiece is placed; a first vibration motor and a second vibration motor whose rotary shafts are laid along a horizontal direction and parallel to each other; a transmission unit where the first vibration motor and the second vibration motor are arranged and that transmits a vibration of the first vibration motor and the second vibration motor to the trough; a first sensor detecting a rotating position of the rotary shaft of the first vibration motor; and a second sensor detecting a rotating position of the rotary shaft of the second vibration motor.

DESCRIPTION OF EXEMPLARY EMBODIMENTS

Preferred embodiments of a vibration generating device, a control method for the vibration generating device, and a pickup system will now be described with reference to the accompanying drawings.

First Embodiment

Figure 1:
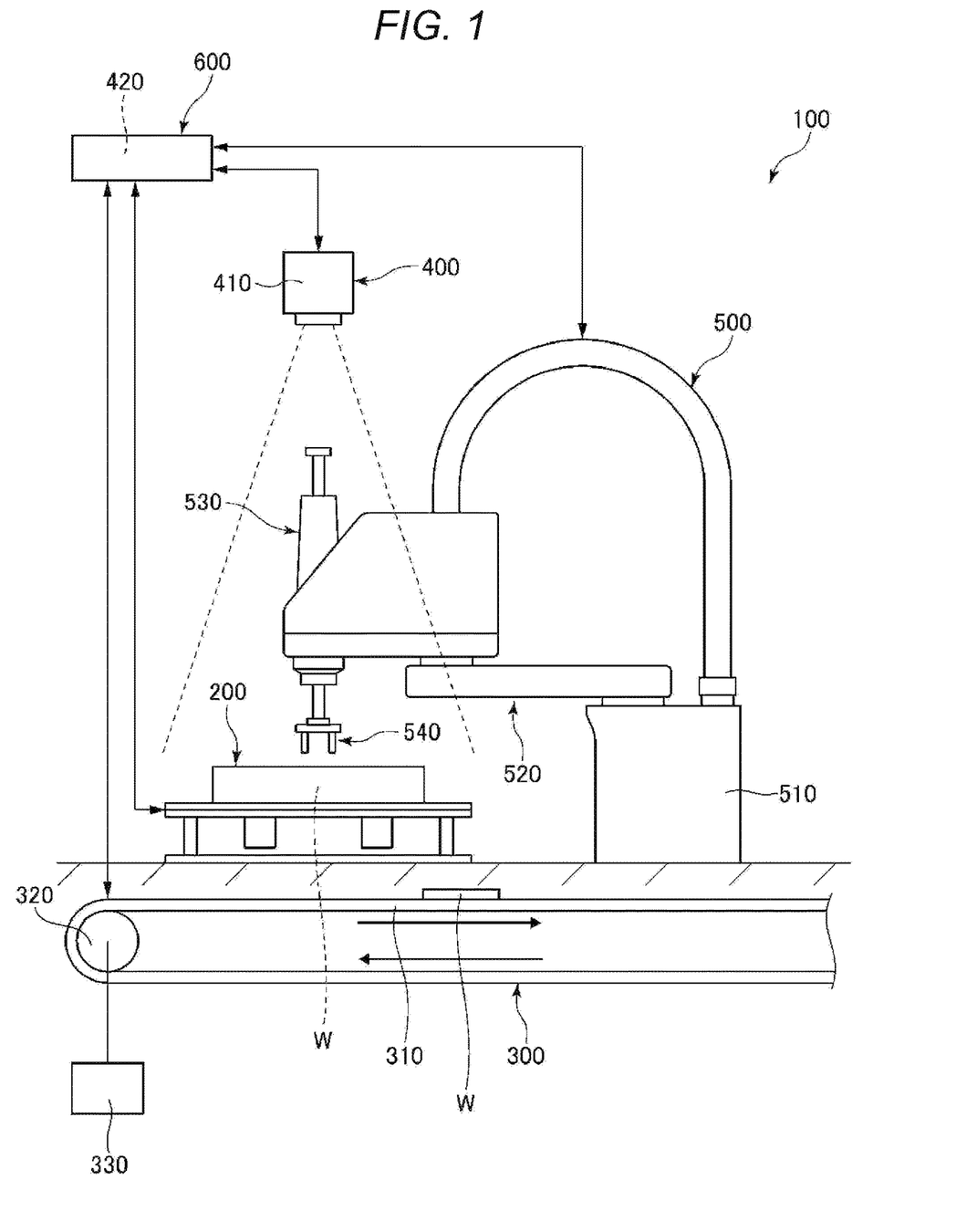
FIG. 1 is a front view showing an overall configuration of a pickup system according to a first embodiment.
Figure 2:
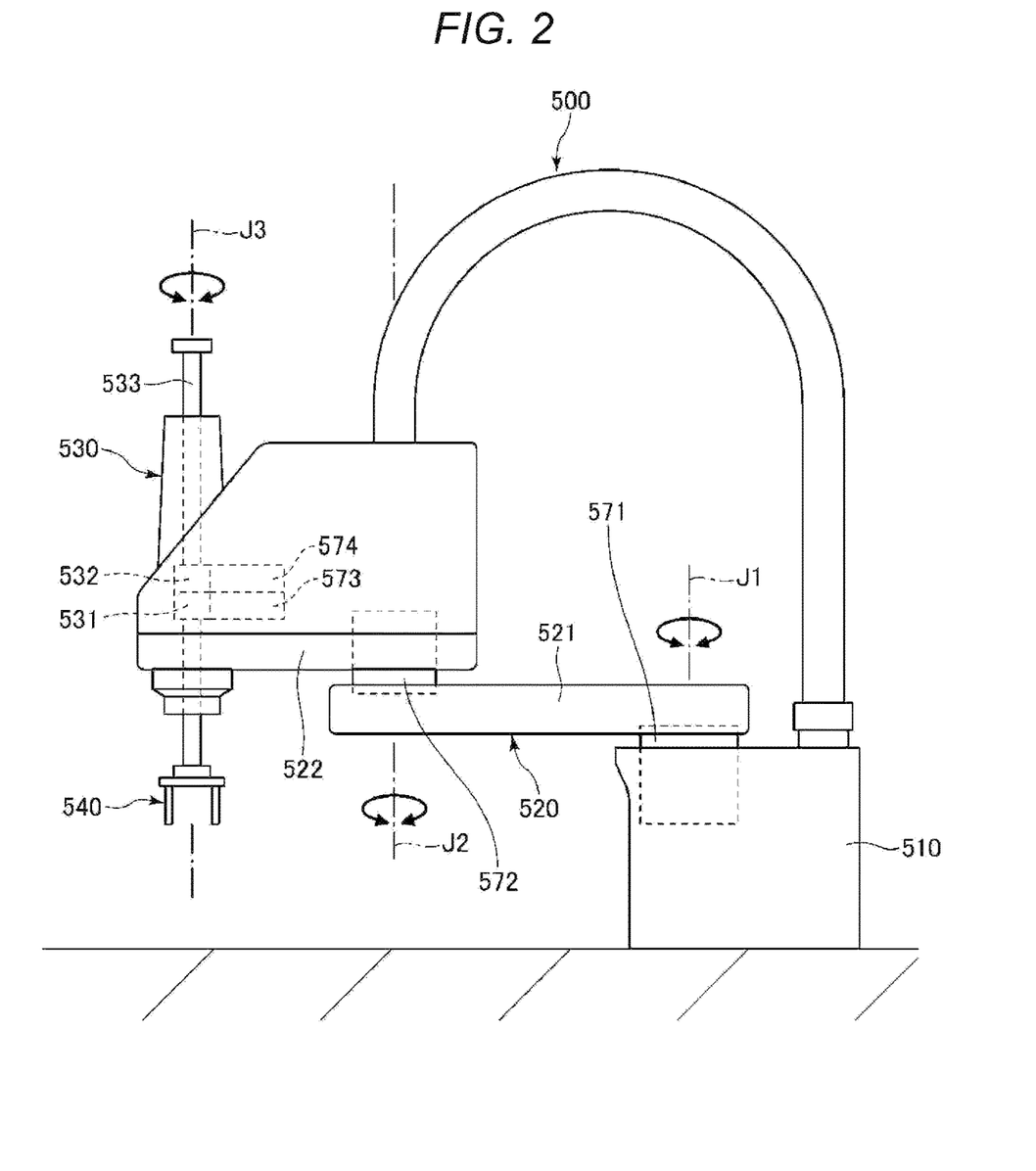
FIG. 2 is a front view showing a robot.
Figure 3:
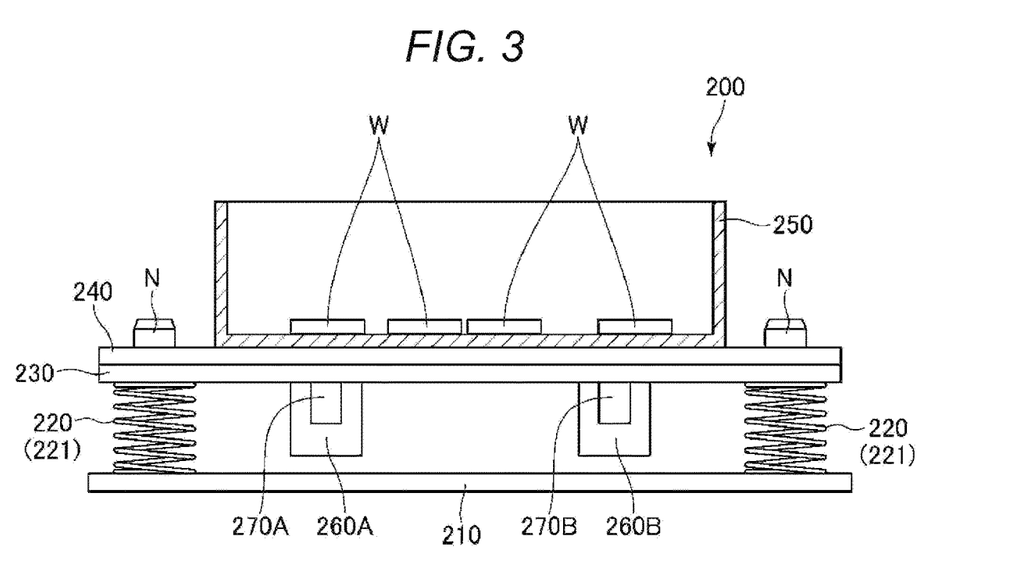
FIG. 3 is a front view showing a vibration generating device.
Figure 4:
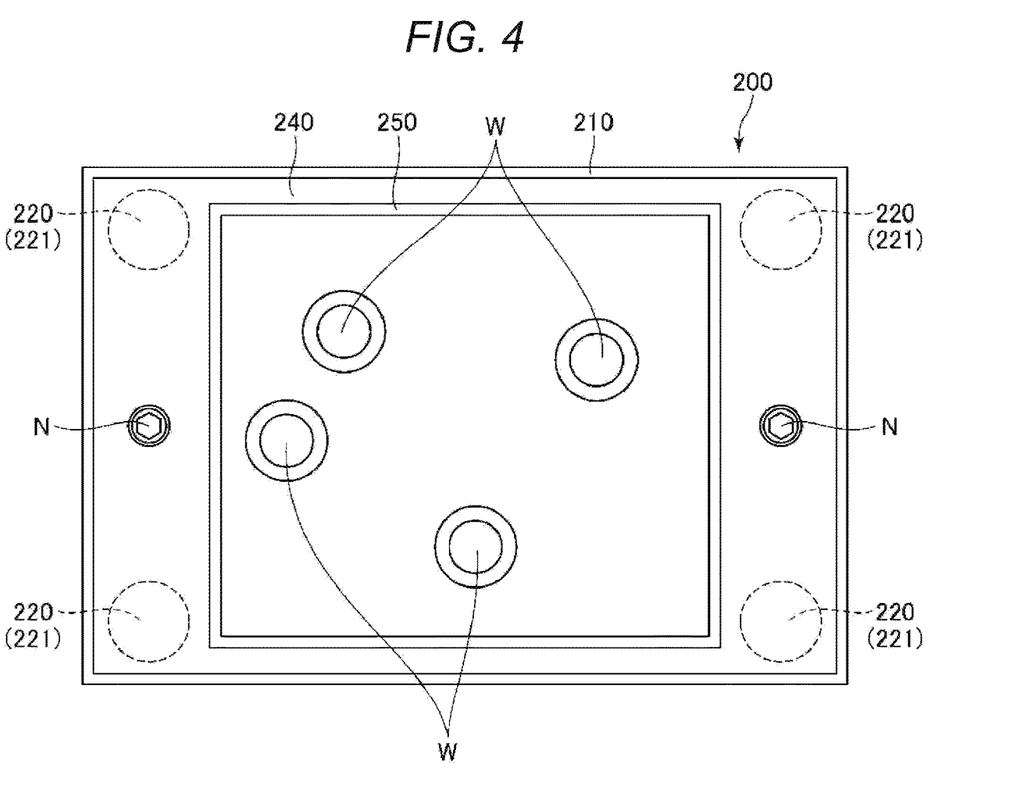
FIG. 4 is a top view showing the vibration generating device.
Figure 5:
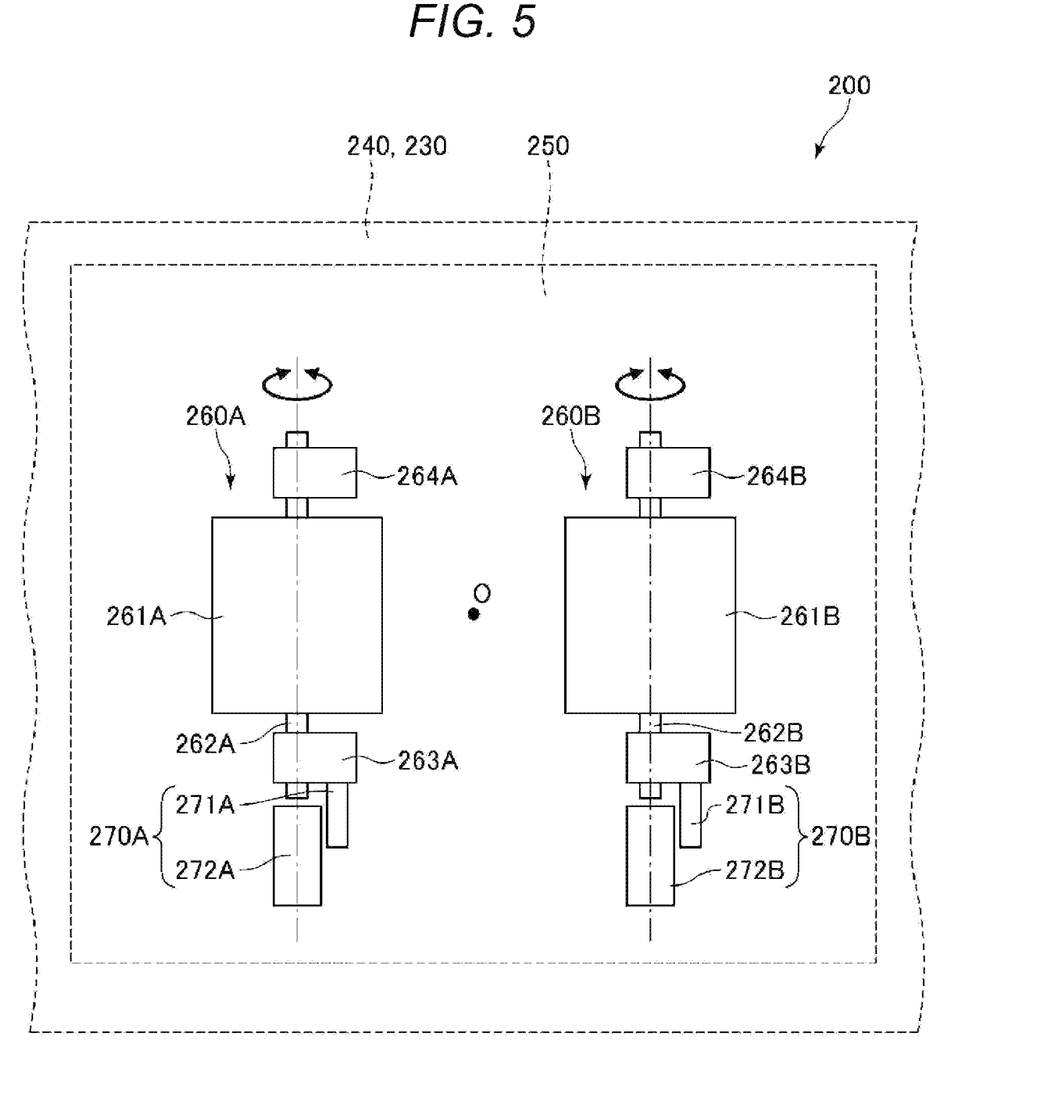
FIG. 5 is a top view showing two vibration motors provided in the vibration generating device.
Figure 6:
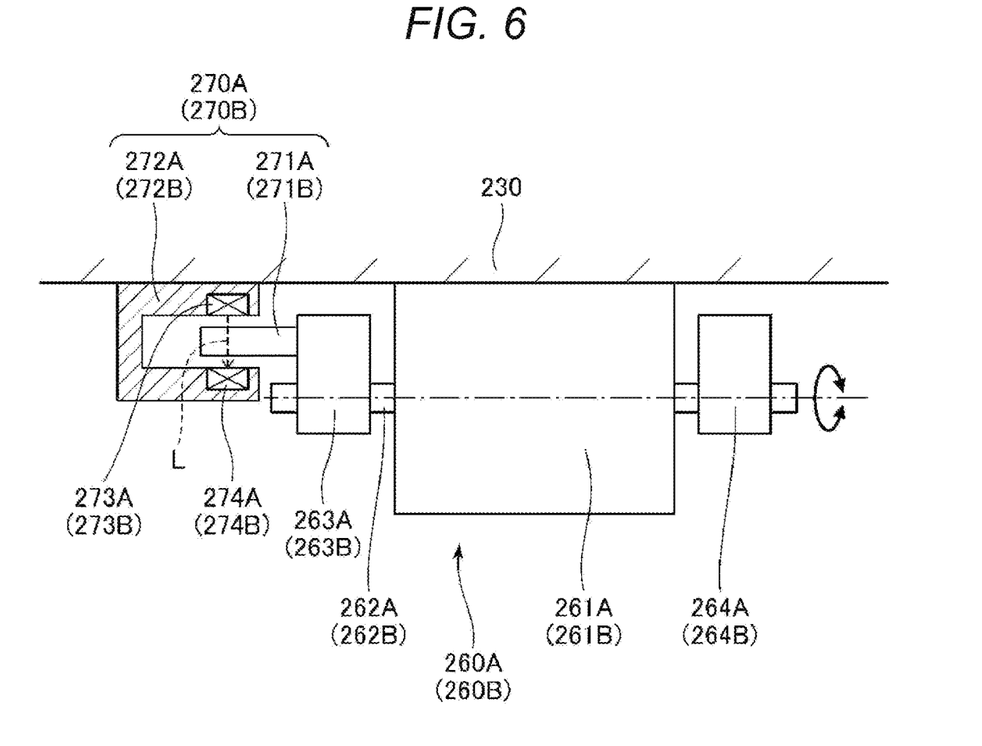
FIG. 6 is a side view showing the vibration motor and a sensor.

FIG. 1 is a front view showing an overall configuration of a pickup system according to a first embodiment. FIG. 2 is a front view showing a robot. FIG. 3 is a front view showing a vibration generating device. FIG. 4 is a top view showing the vibration generating device. FIG. 5 is a top view showing two vibration motors provided in the vibration generating device. FIG. 6 is a side view showing the vibration motor and a sensor. FIGS. 7 to 10 are front views for explaining the driving of the vibration generating device. FIG. 11 is a flowchart showing a method for driving the pickup system.

A pickup system 100 shown in FIG. 1 has: a vibration generating device 200 where a workpiece W, which is an object to be conveyed, is placed; a conveyor 300 as a conveyance device conveying the workpiece W; a vision unit 400 picking up an image of the workpiece W placed in the vibration generating device 200; a robot 500 picking up the workpiece W placed in the vibration generating device 200, based on the result of detection by the vision unit 400, and releasing the workpiece W onto the conveyor 300; and a control device 600 controlling the driving of each of these parts.

Robot 500

The robot 500 is a SCARA robot (horizontal articulated robot). As shown in FIG. 2, the robot 500 has a base 510 fixed to a floor surface and a robot arm 520 coupled to the base 510. The robot arm 520 has a first arm 521 whose proximal end part is coupled to the base 510 and which rotationally moves about a first axis of rotational motion J1 laid along the vertical direction in relation to the base 510, and a second arm 522 whose proximal end part is coupled to a distal end part of the first arm 521 and which rotationally moves about a second axis of rotational motion J2 laid along the vertical direction in relation to the first arm 521.

A work head 530 is provided at a distal end part of the second arm 522. The work head 530 has a spline nut 531 and a ball screw nut 532 coaxially arranged at the distal end part of the second arm 522, and a spline shaft 533 inserted in the spline nut 531 and the ball screw nut 532. The spline shaft 533 is rotatable about a third axis of rotational motion J3 laid along the vertical direction in relation to the second arm 522 and is movable up and down along the third axis of rotational motion J3.

An end effector 540 is attached to a bottom end part of the spline shaft 533. As the end effector 540, a removable end effector suitable for the target work is selected. The end effector 540 in this embodiment is a hand gripping and holding the workpiece W.

The robot 500 also has a first drive device 571 causing the first arm 521 to rotationally move about the first axis of rotational motion J1 in relation to the base 510, a second drive device 572 causing the second arm 522 to rotationally move about the second axis of rotational motion J2 in relation to the first arm 521, a third drive device 573 causing the spline nut 531 to rotate and thus causing the spline shaft 533 to rotate about the third axis of rotational motion J3, and a fourth drive device 574 causing the ball screw nut 532 to rotate and thus causing the spline shaft 533 to move up or down in a direction along the third axis of rotational motion J3.

In each of the first, second, third, and fourth drive devices 571, 572, 573, 574, a motor as a drive source and an encoder detecting the amount of rotation of the motor are installed. The control device 600 executes feedback control so that the position of the robot arm 520 indicated by an output from each encoder coincides with a target position, which is a control target, during the operation of the pickup system 100.

The robot 500 has been described. However, the robot 500 is not particularly limited and may be, for example, a 6-axis robot having a robot arm with six axes of rotation.

Conveyor 300

As shown in FIG. 1, the conveyor 300 has a belt 310 where the workpiece W is placed, a conveyance roller 320 moving the belt 310, a motor, not illustrated, for driving the conveyance roller 320, and an amount-of-conveyance sensor 330 outputting a signal corresponding to the amount of rotation of the conveyance roller 320 to the control device 600. The control device 600 executes feedback control so that the speed of conveyance of the workpiece W indicated by the output from the amount-of-conveyance sensor 330 coincides with a target speed of conveyance, which is a control target, during the operation of the pickup system 100. Thus, the workpiece W can be conveyed stably at a desired speed.

Vision Unit 400

As shown in FIG. 1, the vision unit 400 is a device picking up an image of the workpiece W at the top of the vibration generating device 200 from above the vibration generating device 200 and detecting the position and the overlapping state of the workpiece W, based on the picked-up image. Such a vision unit 400 has a camera 410, and a detection unit 420 detecting the position of at least one workpiece W at the top of the vibration generating device 200, based on image data picked up by the camera 410. In this embodiment, the detection unit 420 is embedded in the control device 600.

The camera 410 is a 3D camera (stereo camera) that can pick up a distance image having depth information (spatial depth information) at each pixel. Each pixel in the camera 410 is associated with global coordinates by the detection unit 420. When the workpiece W exists within the angle of view of the camera 410, the coordinates of the workpiece W can be specified, based on the position of the workpiece W in the image data. However, the configuration of the vision unit 400 is not particularly limited. The vision unit 400 may be configured, for example, by a combination of a 2D camera and a depth sensor or by using a measuring device measuring a three-dimensional shape by the phase shift method.

Vibration Generating Device 200

The vibration generating device 200 has a plate-like base 210, four leg parts 220 standing up at the base 210, a plate-like transmission unit 230 coupled to the base 210 via the leg parts 220, a plate-like trough support unit 240 superimposed on a top surface of the transmission unit 230, a trough 250 that is arranged at a top surface of the trough support unit 240 and where the workpiece W is placed, a first vibration motor 260A and a second vibration motor 260B arranged at a bottom surface of the transmission unit 230, a first sensor 270A detecting the rotation of the first vibration motor 260A, and a second sensor 270B detecting the rotation of the second vibration motor 260B, as shown in FIG. 3.

In the vibration generating device 200 with such a configuration, as the driving of the first and second vibration motors 260A, 260B is controlled by the control device 600, a vibration in a predetermined direction can be applied to the trough 250 and the position and the overlapping state of the workpiece W placed in the trough 250 can thus be changed. Particularly, in the vibration generating device 200, the rotation (directions of eccentricity H1, H2) of the first and second vibration motors 260A, 260B can be detected by the first and second sensors 270A, 270B and therefore a vibration in a predetermined direction can be accurately generated.

Each of the four leg parts 220 has a coil spring 221 and is elastically deformable. These four leg parts 220 are arranged in a well-balanced manner in the four corners of the base 210, as shown in FIG. 4.

As shown in FIG. 3, the plate-like transmission unit 230 is fixed substantially horizontally to the base 210 via the four leg parts 220. Therefore, the transmission unit 230 can easily shake in relation to the base 210 and the vibration of the first and second vibration motors 260A, 260B is augmented and transmitted to the trough 250.

The trough support unit 240 is in the shape of a plate and superimposed on the top surface of the transmission unit 230. The trough support unit 240 is screwed to the transmission unit 230 with a plurality of screws N. The trough 250 is in the shape of a box and arranged substantially horizontally at the top surface of the trough support unit 240. A plurality of workpieces W are randomly accommodated in the trough 250.

As shown in FIG. 3, the first vibration motor 260A and the second vibration motor 260B are arranged at the bottom surface of the transmission unit 230. As shown in FIG. 5, the first vibration motor 260A has a main body unit 261A accommodating a stator and a rotor, not illustrated, a rotary shaft 262A protruding from both sides of the main body unit 261A, and eccentric weights 263A, 264A arranged at both ends of the rotary shaft 262A. When the first vibration motor 260A is driven, the action of the eccentric weights 263A, 264A generates a centrifugal vibration in the rotary shaft 262A. Similarly, the second vibration motor 260B has a main body unit 261B accommodating a stator and a rotor, not illustrated, a rotary shaft 262B protruding from both sides of the main body unit 261B, and eccentric weights 263B, 264B arranged at both ends of the rotary shaft 262B. When such a second vibration motor 260B is driven, the action of the eccentric weights 263B, 264B generates a centrifugal vibration in the rotary shaft 262B. However, the configuration of the first and second vibration motors 260A, 260B is not particularly limited, provided that the first and second vibration motors 260A, 260B can generate a vibration.

As shown in FIG. 5, the first and second vibration motors 260A, 260B are arranged separately on both sides of a center O of the trough 250, as viewed in a plan view from the vertical direction. That is, the first vibration motor 260A is arranged on one side of the center O and the second vibration motor 260B is arranged on the other side of the center O. The rotary shafts 262A, 262B are each substantially horizontal and are arranged parallel to each other. Particularly in this embodiment, the rotary shafts 262A, 262B are arranged in a direction orthogonal to the longitudinal direction of the trough 250. The rotary shafts 262A, 262B are located on the same horizontal plane.

The first sensor 270A detects a rotating position of the rotary shaft 262A of the first vibration motor 260A. The "rotating position of the rotary shaft 262A" means the position of the eccentric weights 263A, 264A, that is, the direction of eccentricity H1 of the rotary shaft 262A. Similarly, the second sensor 270B detects a rotating position of the rotary shaft 262B of the second vibration motor 260B. The "rotating position of the rotary shaft 262B" means the position of the eccentric weights 263B, 264B, that is, the direction of eccentricity H2 of the rotary shaft 262B. The first and second sensors 270A, 270B are transmission-type photoelectric sensors. Thus, the first and second sensors 270A, 270B can be reduced in cost, size, and the like.

As shown in FIG. 6, the first sensor 270A has a protrusion-like first object to be detected 271A arranged at the eccentric weight 263A, and a first detection unit 272A arranged at the bottom surface of the transmission unit 230. The first detection unit 272A has a light-emitting unit 273A emitting light L, and a light-receiving unit 274A arranged opposite the light-emitting unit 273A and receiving the light L from the light-emitting unit 273A. Every time the rotary shaft 262A makes one full rotation, the first object to be detected 271A passes between the light-emitting unit 273A and the light-receiving unit 274A and blocks the light L from the light-emitting unit 273A during the passing, and thus causes the output signal from the light-receiving unit 274A to change. Therefore, the control device 600 can detect the rotating position (direction of eccentricity H1) of the rotary shaft 262A, based on the output signal from the light-receiving unit 274A.

Similarly, the second sensor 270B has a protrusion-like second object to be detected 271B arranged at the eccentric weight 263B, and a second detection unit 272B arranged at the bottom surface of the transmission unit 230. The second detection unit 272B has a light-emitting unit 273B emitting light L, and a light-receiving unit 274B arranged opposite the light-emitting unit 273B and receiving the light L from the light-emitting unit 273B. Every time the rotary shaft 262B makes one full rotation, the second object to be detected 271B passes between the light-emitting unit 273B and the light-receiving unit 274B and blocks the light L from the light-emitting unit 273B during the passing, and thus causes the output signal from the light-receiving unit 274B to change. Therefore, the control device 600 can detect the rotating position (direction of eccentricity H2) of the rotary shaft 262B, based on the output signal from the light-receiving unit 274B.

The first vibration motor 260A and the second vibration motor 260B are arranged in such a way that the ends of these motors where the first and second sensors 270A, 270B are arranged are located on the same side. This makes it easier to arrange the first and second sensors 270A, 270B and couple a wiring to the first and second sensors 270A, 270B.

The first and second sensors 270A, 270B are not particularly limited and may be, for example, reflection-type photoelectric sensors where the light-receiving units 274A, 274B receive the light L reflected by the first and second objects to be detected 271A, 271B, or may be encoders. When encoders are employed, the encoders may be absolute encoders or incremental encoders. In this embodiment, the first sensor 270A is arranged outside the first vibration motor 260A. However, this is not limiting. For example, the first sensor 270A may be arranged inside the first vibration motor 260A.

A method for driving the vibration generating device 200 with such a configuration will now be described in detail with reference to FIGS. 7 to 10. In the vibration generating device 200, the driving of the first vibration motor 260A and the driving of the second vibration motor 260B are individually controlled and a vibration in a predetermined direction can thus be applied to the trough 250.

Figure 7:
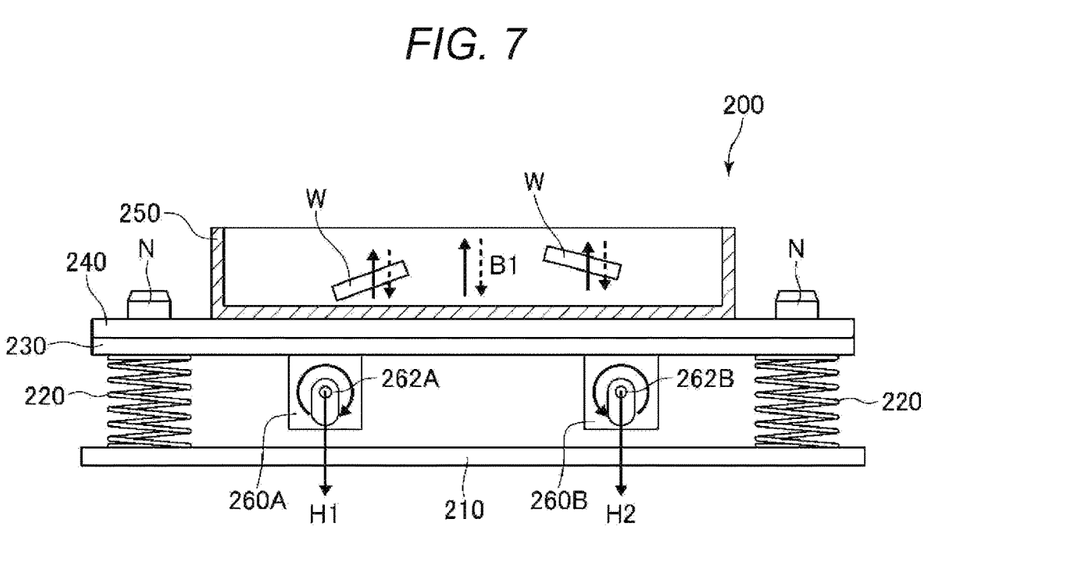
FIG. 7 is a front view for explaining the driving of the vibration generating device.

For example, as shown in FIG. 7, when the first and second vibration motors 260A, 260B are driven to rotate in the opposite directions from each other in the state where the rotary shafts 262A, 262B are in the same rotating position based on the output signals from the first and second sensors 270A, 270B in such a way that both the directions of eccentricity H1, H2 are downward in the vertical direction, a vibration B1 in an up-down direction is applied to the trough 250 while the leg parts 220 are elastically deformed due to the offset and superimposition of the vibration of the first vibration motor 260A and the vibration of the second vibration motor 260B. Thus, the workpiece W in the trough 250 vibrates like jumping up and down.

Figure 8:
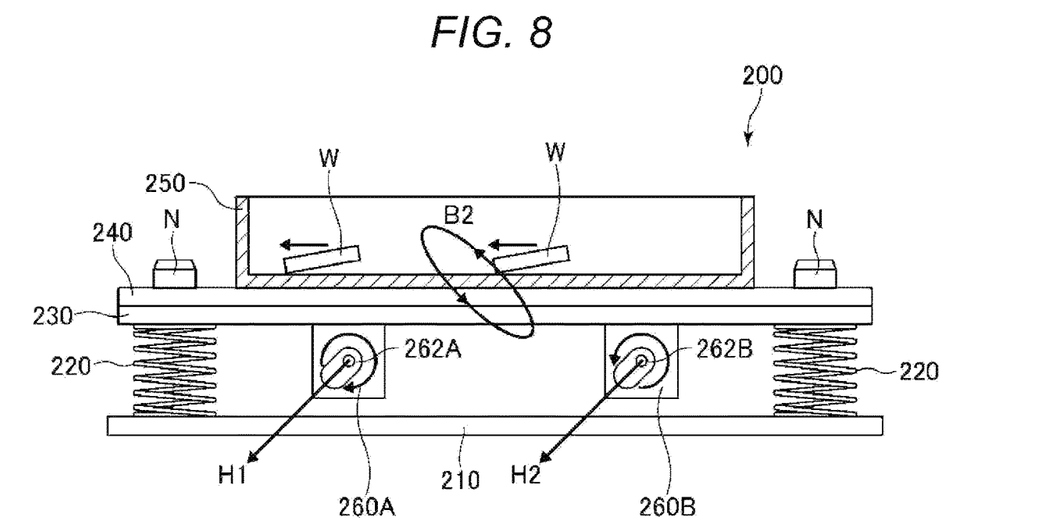
FIG. 8 is a front view for explaining the driving of the vibration generating device.

Also, for example, as shown in FIG. 8, when the first and second vibration motors 260A, 260B are driven to rotate in the opposite directions from each other in the state where the rotary shafts 262A, 262B are in the same rotating position based on the output signals from the first and second sensors 270A, 270B in such a way that both the directions of eccentricity H1, H2 are obliquely downward to the left, a vibration B2 in an oblique direction is applied to the trough 250 while the leg parts 220 are elastically deformed due to the offset and superimposition of the vibration of the first vibration motor 260A and the vibration of the second vibration motor 260B. Thus, the workpiece W in the trough 250 moves to the left. Even when the first and second vibration motors 260A, 260B are driven to rotate in the same direction as each other, the workpiece W moves similarly.

Figure 9:
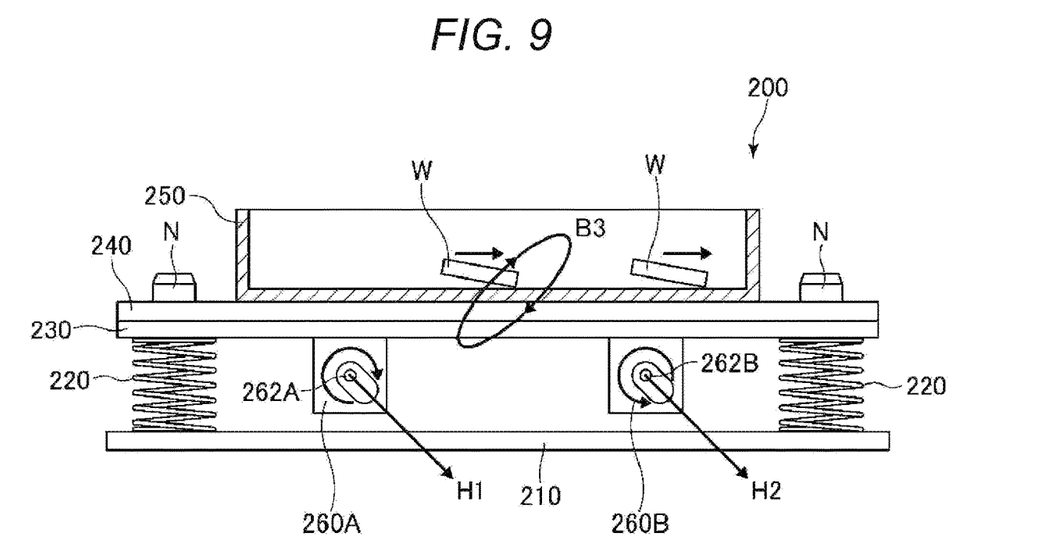
FIG. 9 is a front view for explaining the driving of the vibration generating device.

Also, for example, as shown in FIG. 9, when the first and second vibration motors 260A, 260B are driven to rotate in the opposite directions from each other in the state where the rotary shafts 262A, 262B are in the same rotating position based on the output signals from the first and second sensors 270A, 270B in such a way that both the directions of eccentricity H1, H2 are obliquely downward to the right, a vibration B3 in an oblique direction is applied to the trough 250 while the leg parts 220 are elastically deformed due to the offset and superimposition of the vibration of the first vibration motor 260A and the vibration of the second vibration motor 260B. Thus, the workpiece W in the trough 250 moves to the right. Even when the first and second vibration motors 260A, 260B are driven to rotate in the same direction as each other, the workpiece W moves similarly.

Figure 10:
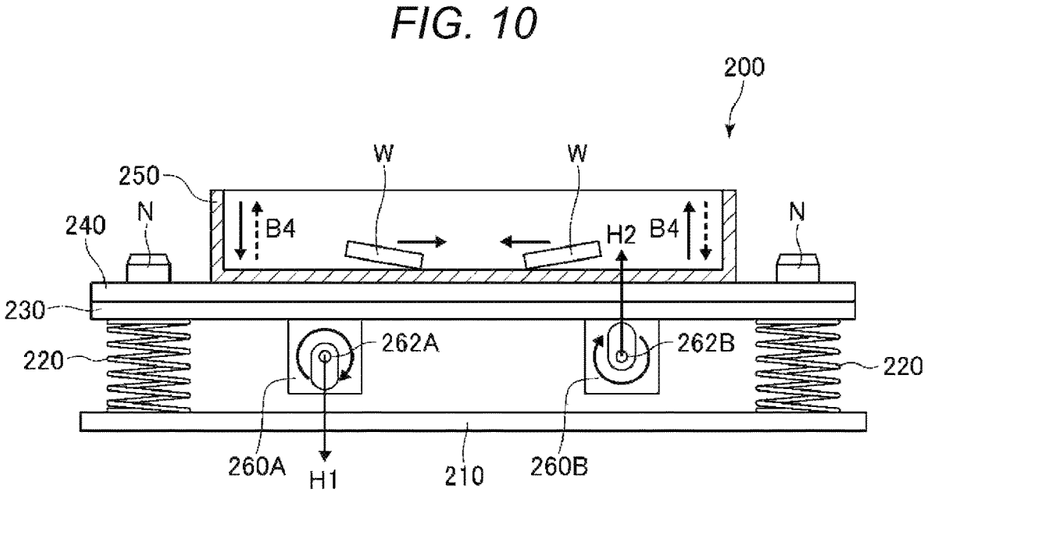
FIG. 10 is a front view for explaining the driving of the vibration generating device.
Figure 11:
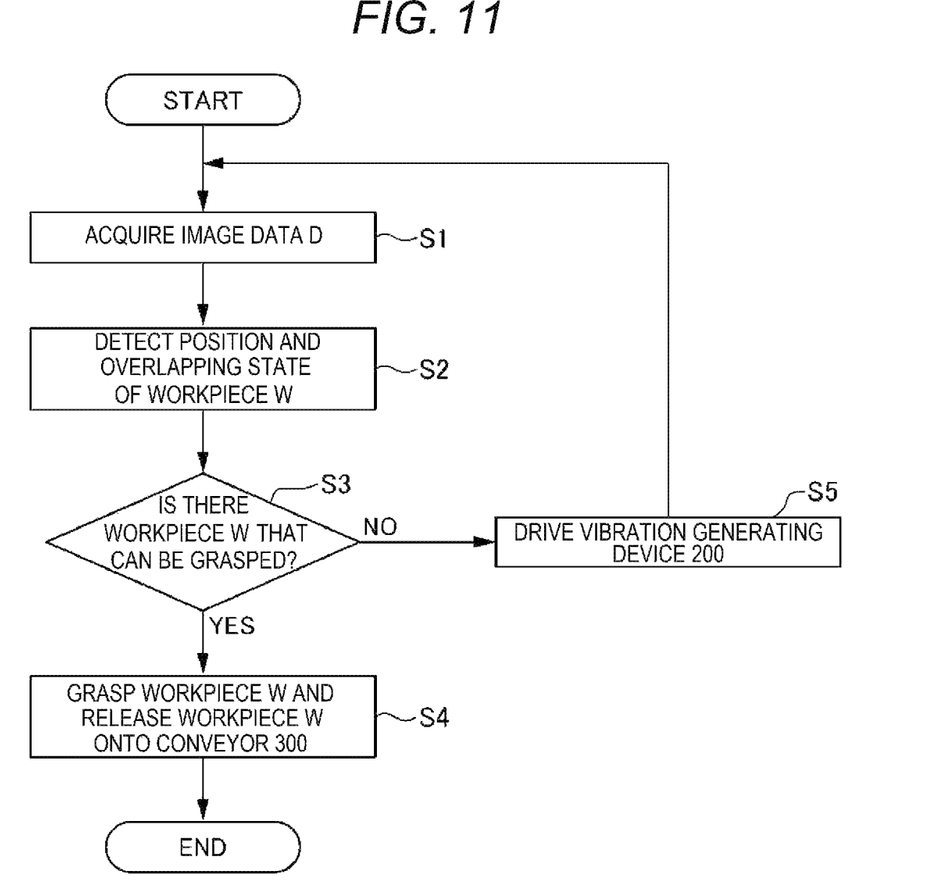
FIG. 11 is a flowchart showing a method for driving the pickup system.

Also, for example, as shown in FIG. 10, when the first and second vibration motors 260A, 260B are driven to rotate in the same direction as each other in the state where the rotary shafts 262A, 262B are in the same rotating position based on the output signals from the first and second sensors 270A, 270B in such a way that the direction of eccentricity H1 is downward in the vertical direction whereas the direction of eccentricity H2 is upward in the vertical direction, a vibration B4 is applied to the trough 250 while the leg parts 220 are elastically deformed due to the offset and superimposition of the vibration of the first vibration motor 260A and the vibration of the second vibration motor 260B. Thus, the workpiece W in the trough 250 moves toward the center. Even when the first and second vibration motors 260A, 260B are driven to rotate in the opposite directions from each other, the workpiece W moves similarly.

Particularly in the vibration generating device 200, the rotating positions of the rotary shafts 262A, 262B can be detected, based on the output signals from the first and second sensors 270A, 270B, and therefore the rotating positions of the rotary shafts 262A, 262B can be more accurately adjusted to a desired start position. Thus, the direction of vibration of the trough 250 can be accurately controlled.

Control Device 600

The control device 600 controls the driving of each of the vibration generating device 200, the conveyor 300, the vision unit 400, and the robot 500. Such a control device 600 has, for example, a processor (CPU) formed by a computer and processing information, a memory communicatively coupled to the processor, and an external interface for coupling to an external device. In the memory, various programs executable by the processor are saved. The processor can read and execute the various programs and the like stored in the memory. A part or all of the components of the control device 600 may be arranged inside the casing of the robot 500. The control device 600 may also be formed by a plurality of processors.

The pickup system 100 has been described. A method for driving the pickup system 100 will now be briefly described with reference to FIG. 11. First, in step S1, in the state where the robot 500 is in an attitude that does not obstruct image pickup, an image of the workpiece W in the trough 250 is picked up by the camera 410 and image data D is thus acquired. Next, in step S2, the position and the overlapping state of at least one workpiece W are detected, based on the image data D. For example, template matching can be used to detect the position and the overlapping state of the workpiece W.

Next, in step S3, whether or not there is a workpiece W that can be grasped by the robot 500 among the workpieces W whose positions are detected, is detected. As a condition for determining that a workpiece W can be grasped, for example, the position of the workpiece W in the trough 250 or the overlapping state with another workpiece W or the like can be set. When there is a workpiece W that can be grasped by the robot 500, the workpiece W is grasped by the robot 500 and released onto the belt 310 of the conveyor 300 in step S4. Thus, the workpiece W is conveyed to a predetermined place by the conveyor 300.

Meanwhile, when there is no workpiece W that can be grasped by the robot 500 in step S3, the vibration generating device 200 is driven in step S5 to reset the position of the workpiece W in the trough 250 or resolve the overlap of workpieces W, and execute the processing again from step S1. Such a driving method enables the robot 500 to grasp the workpiece W more securely.

The pickup system 100 has been described. The vibration generating device 200 included in such a pickup system 100 has: the trough 250, where the workpiece W is placed; the first vibration motor 260A and the second vibration motor 260B, whose rotary shafts 262A, 262B are laid along the horizontal direction and parallel to each other; the transmission unit 230, where the first vibration motor 260A and the second vibration motor 260B are arranged and which transmits the vibrations of the first vibration motor 260A and the second vibration motor 260B to the trough 250; the first sensor 270A detecting the rotating position of the rotary shaft 262A of the first vibration motor 260A; and the second sensor 270B detecting the rotating position of the rotary shaft 262B of the second vibration motor 260B, as described above. Such a configuration enables the detection of the rotating positions of the rotary shafts 262A, 262B, based on the output signals from the first and second sensors 270A, 270B. Therefore, the rotation start positions of the rotary shafts 262A, 262B can be accurately adjusted to a desired position. Thus, the direction of vibration of the trough 250 can be accurately controlled.

As described above, in the vibration generating device 200, each of the first sensor 270A and the second sensor 270B is a photoelectric sensor. Thus, the first sensor 270A and the second sensor 270B have a simple configuration.

As described above, in the vibration generating device 200, the first sensor 270A is arranged at one end side of the rotary shaft 262A of the first vibration motor 260A and the second sensor 270B is arranged at one end side of the rotary shaft 262B of the second vibration motor 260B. The first vibration motor 260A and the second vibration motor 260B are arranged in such a way that the one end sides of these motors are located on the same side. This makes it easier to arrange the first and second sensors 270A, 270B and couple a wiring to the first and second sensors 270A, 270B.

As described above, in the control method for the vibration generating device 200 including: the trough 250, where the workpiece W is placed; the first vibration motor 260A and the second vibration motor 260B, whose rotary shafts 262A, 262B are laid along the horizontal direction and parallel to each other; the transmission unit 230, where the first vibration motor 260A and the second vibration motor 260B are arranged and which transmits the vibrations of the first vibration motor 260A and the second vibration motor 260B to the trough 250; the first sensor 270A detecting the rotating position of the rotary shaft 262A of the first vibration motor 260A; and the second sensor 270B detecting the rotating position of the rotary shaft 262B of the second vibration motor 260B, the driving of the first vibration motor 260A and the second vibration motor 260B is controlled, based on the results of detection by the first sensor 270A and the second sensor 270B. The rotating positions of the rotary shafts 262A, 262B can be detected, based on the output signals from the first and second sensors 270A, 270B. Therefore, such a control method enables accurate adjustment of the rotation start positions of the rotary shafts 262A, 262B to a desired position. Thus, the direction of vibration of the trough 250 can be accurately controlled.

As described above, the pickup system 100 has: the vibration generating device 200, where the workpiece W is placed and which applies a vibration to the workpiece W and thus changes the position of the workpiece W; the vision unit 400 picking up an image of the workpiece W placed in the vibration generating device 200 and detecting the position of the workpiece W, based on the result of the image pickup; and the robot 500 picking up the workpiece W placed in the vibration generating device 200, based on the result of the detection by the vision unit 400. The vibration generating device 200 has: the trough 250, where the workpiece W is placed; the first vibration motor 260A and the second vibration motor 260B, whose rotary shafts 262A, 262B are laid along the horizontal direction and parallel to each other; the transmission unit 230, where the first vibration motor 260A and the second vibration motor 260B are arranged and which transmits the vibrations of the first vibration motor 260A and the second vibration motor 260B to the trough 250; the first sensor 270A detecting the rotating position of the rotary shaft 262A of the first vibration motor 260A; and the second sensor 270B detecting the rotating position of the rotary shaft 262B of the second vibration motor 260B. Such a configuration enables the detection of the rotating positions of the rotary shafts 262A, 262B, based on the output signals from the first and second sensors 270A, 270B. Therefore, the rotation start positions of the rotary shafts 262A, 262B can be accurately adjusted to a desired position. Thus, the direction of vibration of the trough 250 can be accurately controlled.

Second Embodiment

Figure 12:
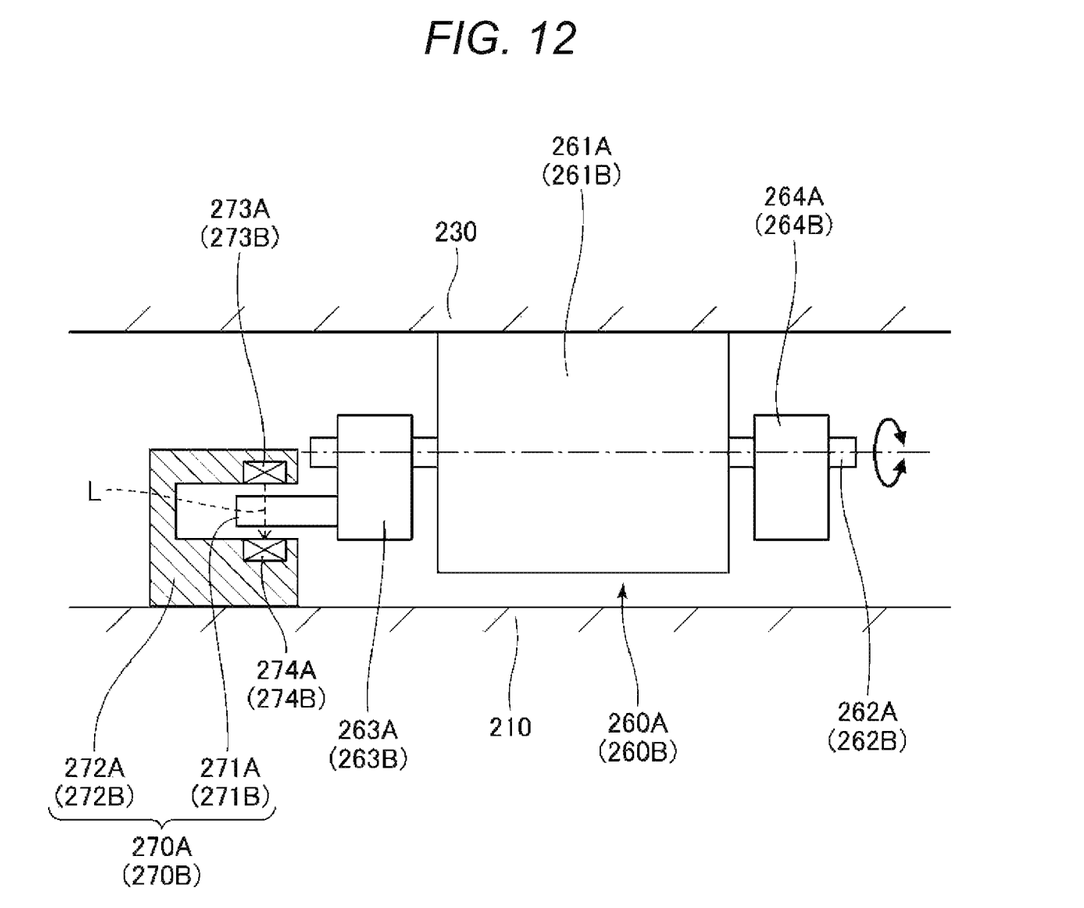
FIG. 12 is a side view showing a vibration motor and a sensor provided in a vibration generating device according to a second embodiment.

FIG. 12 is a side view showing a vibration motor and a sensor provided in a vibration generating device according to a second embodiment.

The vibration generating device 200 according to this embodiment is similar to the vibration generating device 200 in the first embodiment except for the arrangement of the first sensor 270A and the second sensor 270B. Therefore, in the description below, this embodiment is described mainly in terms of the difference from the first embodiment, and similar matters are not described further. In the drawing according to this embodiment, components similar to those in the foregoing embodiment are denoted by the same reference signs.

As shown in FIG. 12, in the vibration generating device 200 according to this embodiment, the first detection unit 272A of the first sensor 270A and the second detection unit 272B of the second sensor 270B are each arranged at a different site from the transmission unit 230. Thus, the vibrations of the first and second vibration motors 260A, 260B are less likely to be transmitted to the first detection unit 272A and the second detection unit 272B and therefore the durability of the first sensor 270A and the second sensor 270B is improved.

Particularly, the first detection unit 272A and the second detection unit 272B are each arranged at the top surface of the base 210. Therefore, the elastically deformable leg parts 220 are present between the first and second detection units 272A, 272B and the first and second vibration motors 260A, 260B, making the vibrations of the first and second vibration motors 260A, 260B less likely to be transmitted to the first and second detection units 272A, 272B. Thus, the durability of the first and second sensors 270A, 270B is enhanced further.

As described above, in the vibration generating device 200 according to this embodiment, the first sensor 270A has the first object to be detected 271A arranged at the first vibration motor 260A, and the first detection unit 272A detecting the first object to be detected 271A. The second sensor 270B has the second object to be detected 271B arranged at the second vibration motor 260B, and the second detection unit 272B detecting the second object to be detected 271B. The first detection unit 272A and the second detection unit 272B are each arranged at a different site from the transmission unit 230. This makes the vibrations of the first and second vibration motors 260A, 260B less likely to be transmitted to the first detection unit 272A and the second detection unit 272B. Therefore, the durability of the first detection unit 272A and the second detection unit 272B is improved.

Particularly, the vibration generating device 200 according to this embodiment has the base 210, and the leg parts 220, which couple the base 210 to the transmission unit 230 and are elastically deformed. The first detection unit 272A and the second detection unit 272B are each arranged at the base 210. Thus, the elastically deformable leg parts 220 are present between the first and second detection units 272A, 272B and the first and second vibration motors 260A, 260B, making the vibrations of the first and second vibration motors 260A, 260B less likely to be transmitted to the first and second detection units 272A, 272B. Therefore, the durability of the first and second detection units 272A, 272B is enhanced further.

Such a second embodiment, too, can achieve effects similar to those of the first embodiment.

Third Embodiment

Figure 13:
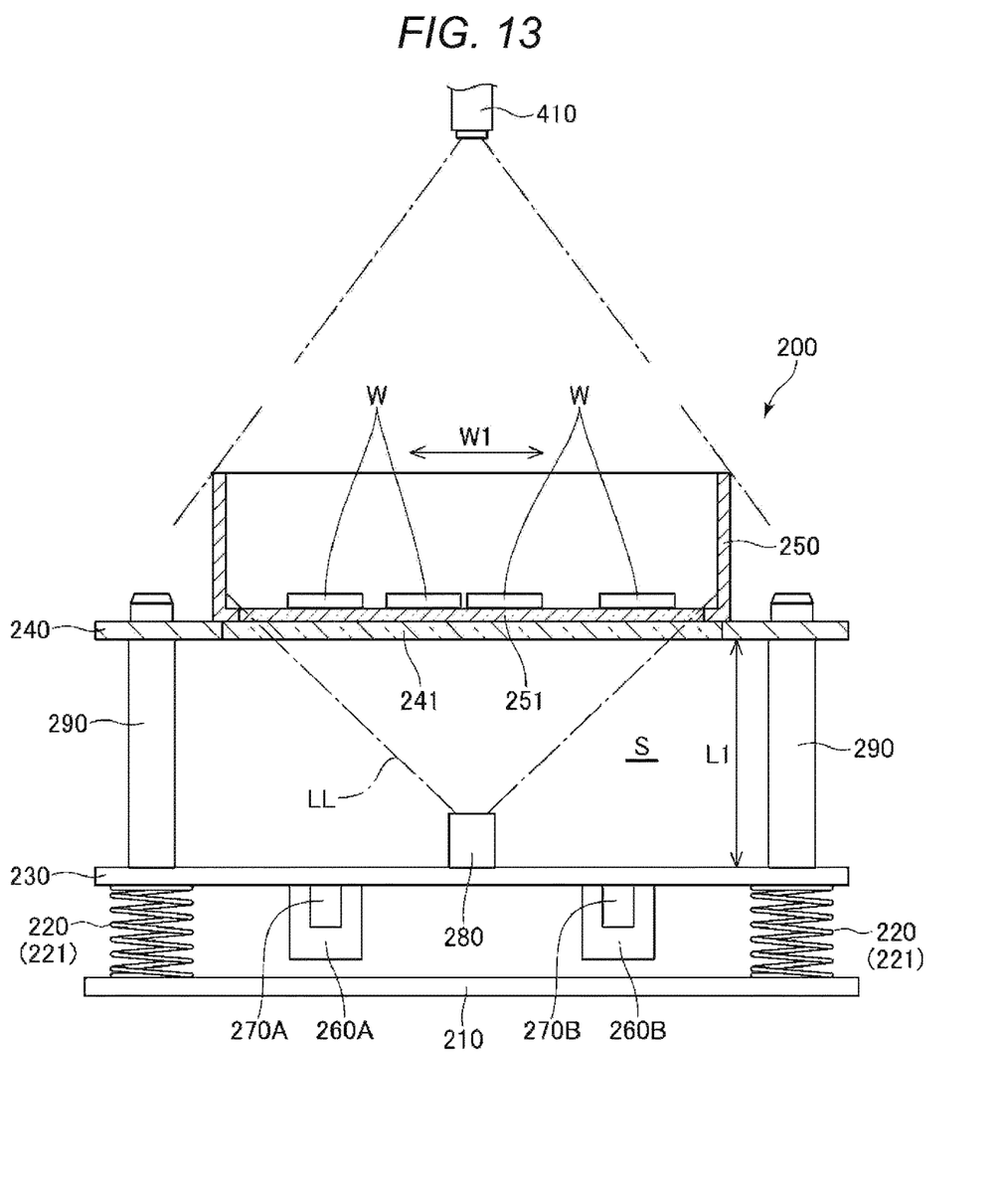
FIG. 13 is a front view showing a vibration generating device according to a third embodiment.

FIG. 13 is a front view showing a vibration generating device according to a third embodiment.

The vibration generating device 200 according to this embodiment is similar to the vibration generating device 200 in the first embodiment except that a space S is formed between the trough 250 and the transmission unit 230. Therefore, in the description below, this embodiment is described mainly in terms of the difference from the first embodiment, and similar matters are not described further. In the drawing according to this embodiment, components similar to those in the foregoing embodiment are denoted by the same reference signs.

As shown in FIG. 13, in the vibration generating device 200 according to this embodiment, a columnar spacer 290 extending in the vertical direction is arranged between the transmission unit 230 supporting the first and second vibration motors 260A, 260B and the trough support unit 240 supporting the trough 250. This spacer 290 allows the space S to be formed between the transmission unit 230 and the trough support unit 240, that is, between the transmission unit 230 and the trough 250. The space S can be easily formed by using the spacer 290.

In such a configuration, for example, a distance L1 between the leg part 220 and the trough support unit 240 is longer than in the first embodiment and therefore an amplitude W1 of the trough support unit 240 as of when the first and second vibration motors 260A, 260B are made to vibrate is greater. Thus, a greater vibration can be applied to the trough 250.

Also, a light source 280 is arranged in the space S formed by the spacer 290. A part at the center of the trough support unit 240 and overlapping the trough 250 is a light-transmissive window part 241. The bottom side of the trough 250, too, is a light-transmissive window part 251. The light source 280 emits light LL toward the trough 250 and illuminates the workpiece W placed in the trough 250, from below via the window parts 241, 251. Thus, brighter image data is acquired from the camera 410, or the shutter speed of the camera 410 is increased and sharp image data without blur is acquired. Therefore, the image recognition of the workpiece W can be accurately performed.

As described above, in the vibration generating device 200 according to this embodiment, the space S is provided between the trough 250 and the transmission unit 230. Thus, a greater vibration can be applied to the trough 250.

As described above, the trough 250 has the window part 251 as a light-transmissive light-transmitting part, and the light source 280 illuminating the workpiece W placed in the trough 250, via the window part 251, is arranged in the space S. Thus, brighter image data is acquired from the camera 410, or the shutter speed of the camera 410 is increased and sharp image data without blur is acquired. Therefore, the image recognition of the workpiece W can be accurately performed.

As described above, the spacer 290 forming the space S is arranged between the trough 250 and the transmission unit 230. Thus, the space S can be easily formed. Also, the size of the space S can be easily changed by adjusting the length of the spacer 290.

Such a third embodiment, too, can achieve effects similar to those of the first embodiment.

Fourth Embodiment

Figure 14:
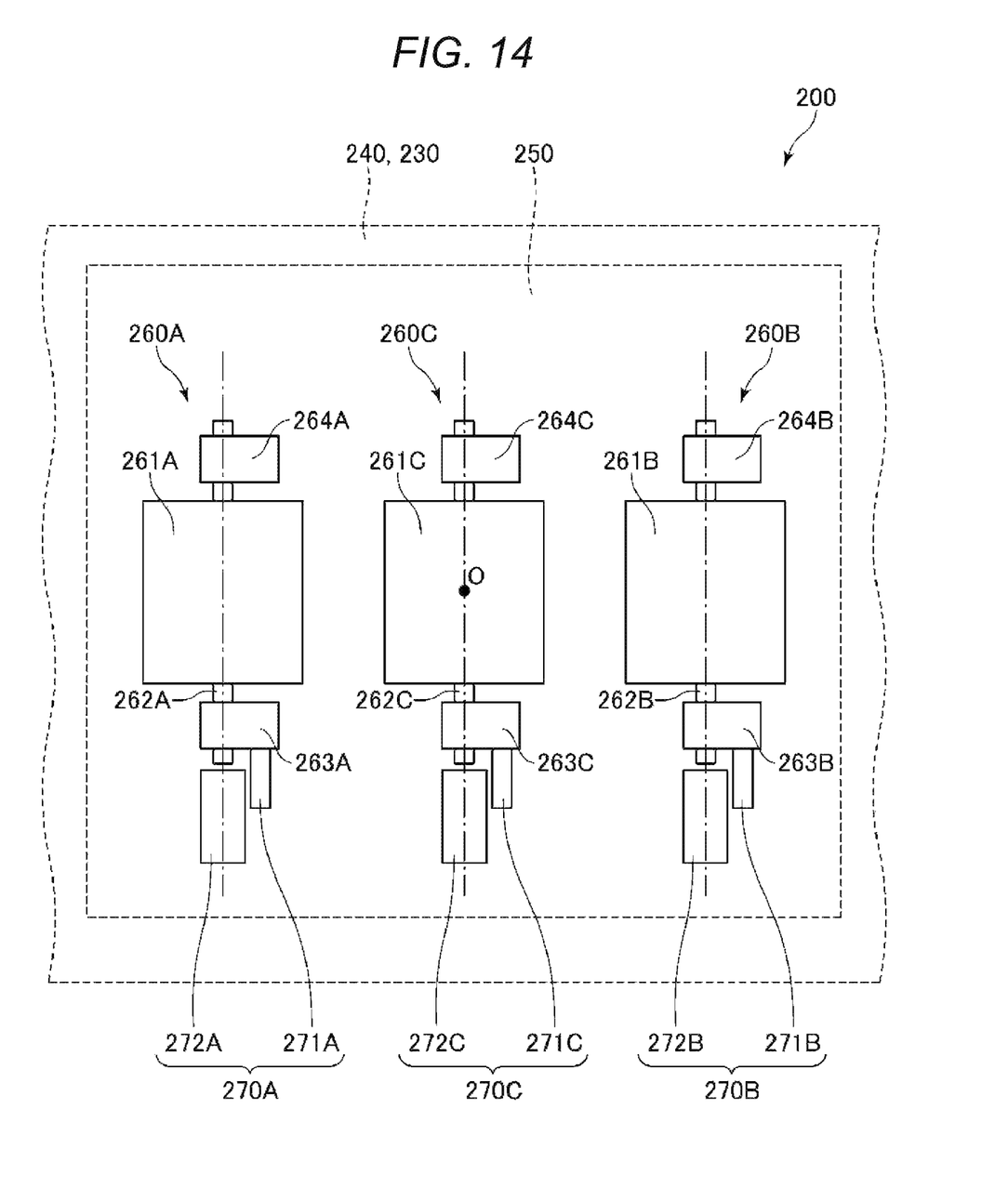
FIG. 14 is a top view showing three vibration motors provided in a vibration generating device according to a fourth embodiment.

FIG. 14 is a top view showing three vibration motors provided in a vibration generating device according to a fourth embodiment.

The vibration generating device 200 according to this embodiment is similar to the vibration generating device 200 in the first embodiment except for additionally having a third vibration motor 260C and a third sensor 270C. Therefore, in the description below, this embodiment is described mainly in terms of the difference from the first embodiment, and similar matters are not described further. In the drawing according to this embodiment, components similar to those in the foregoing embodiment are denoted by the same reference signs.

As shown in FIG. 14, the vibration generating device 200 according to this embodiment has the third vibration motor 260C and the third sensor 270C detecting the rotation of the third vibration motor 260C. The third vibration motor 260C has a configuration similar to the first and second vibration motors 260A, 260B, and has a main body unit 261C accommodating a stator and a rotor, not illustrated, a rotary shaft 262C protruding from both sides of the main body unit 261C, and eccentric weights 263C, 264C arranged at both ends of the rotary shaft 262C.

Such a third vibration motor 260C is located between the first and second vibration motors 260A, 260B and is arranged in such a way as to overlap the center O of the trough 250 as viewed in a plan view from the vertical direction. The rotary shaft 262C is arranged substantially horizontally and parallel to the rotary shafts 262A, 262B. Particularly in this embodiment, the rotary shaft 262C is located on the same horizontal plane as the rotary shafts 262A, 262B.

The third sensor 270C detects the rotating position of the rotary shaft 262C of the third vibration motor 260C. The third sensor 270C has a configuration similar to the first and second sensors 270A, 270B and is a transmission-type photoelectric sensor having a third object to be detected 271C and a third detection unit 272C. Thus, the third sensor 270C can be reduced in cost, size, and the like.

The end of the third vibration motor 260C on the side where the third sensor 270C is provided is arranged to be located on the same side as the first and second sensors 270A, 270B. This makes it easier to arrange the first, second, and third sensors 270A, 270B, 270C and couple a wiring to the first, second, and third sensors 270A, 270B, 270C.

In the vibration generating device 200 with such a configuration, as the driving of the first, second, and third vibration motors 260A, 260B, 260C is controlled by the control device 600, a vibration in a predetermined direction can be applied to the trough 250 and the position and the overlapping state of the workpiece W placed in the trough 250 can thus be changed. Particularly in this embodiment, three vibration motors are used and therefore a wider variety of vibrations can be generated than in the first embodiment.

The vibration generating device, the control method for the vibration generating device, and the pickup system according to the present disclosure have been described, based on the illustrated embodiments. However, the present disclosure is not limited to these embodiments. The configuration of each part can be replaced with any configuration having a similar function. Also, any other component may be added to the present disclosure. The embodiments may be combined together where appropriate. The number of vibration motors is not limited to two or three and may be four or more.

What is claimed is:

1. A vibration generating device comprising:
 a trough where a workpiece is placed;
 a first vibration motor and a second vibration motor whose rotary shafts are laid along a horizontal direction and parallel to each other;
 a transmission unit where the first vibration motor and the second vibration motor are arranged and that transmits a vibration of the first vibration motor and the second vibration motor to the trough;
 a first sensor detecting a rotating position of the rotary shaft of the first vibration motor; and
 a second sensor detecting a rotating position of the rotary shaft of the second vibration motor,
 wherein
 the first sensor has a first object to be detected that is arranged at the first vibration motor. and a first detection unit detecting the first object to be detected,
 the second sensor has a second object to be detected that is arranged at the second vibration motor, and a second detection unit detecting the second object to be detected, and each of the first detection unit and the second detection unit is arranged at a different site from the transmission unit.

2. The vibration generating device according to claim 1, wherein
each of the first sensor and the second sensor is a photoelectric sensor.

3. The vibration generating device according to claim 1, wherein
the first sensor is arranged at one end side of the rotary shaft of the first vibration motor,
the second sensor is arranged at one end side of the rotary shaft of the second vibration motor, and
the first vibration motor and the second vibration motor are arranged in such a way that the one end sides thereof are located on the same side.

4. The vibration generating device according to claim 1, further comprising:
a base; and
a leg part coupling the base to the transmission unit and being elastically deformed, wherein
each of the first detection unit and the second detection unit is arranged at the base.

5. The vibration generating device according to claim 1, wherein
a space is provided between the trough and the transmission unit.

6. The vibration generating device according to claim 5, wherein
the trough has a light-transmissive light-transmitting part, and
a light source illuminating the workpiece arranged in the trough, via the light-transmitting part, is arranged in the space.

7. The vibration generating device according to claim 6, wherein
a spacer forming the space is arranged between the trough and the transmission unit.

8. A control method for a vibration generating device, the vibration generating device comprising:
a trough where a workpiece is placed;
a first vibration motor and a second vibration motor whose rotary shafts are laid along a horizontal direction and parallel to each other;
a transmission unit where the first vibration motor and the second vibration motor are arranged and that transmits a vibration of the first vibration motor and the second vibration motor to the trough;
a first sensor detecting a rotating position of the rotary shaft of the first vibration motor; and
a second sensor detecting a rotating position of the rotary shaft of the second vibration motor,
wherein
the first sensor has a first object to be detected that is arranged at the first vibration motor. and a first detection unit detecting the first object to be detected,
the second sensor has a second object to be detected that is arranged at the second vibration motor, and a second detection unit detecting the second object to be detected, and
each of the first detection unit and the second detection unit is arranged at a different site from the transmission unit
the control method comprising:
controlling driving of the first vibration motor and the second vibration motor, based on a result of detection by the first sensor and the second sensor.

9. A pickup system comprising:
a vibration generating device where a workpiece is placed and that applies a vibration to the workpiece and thus changes a position of the workpiece;
a vision unit picking up an image of the workpiece placed in the vibration generating device and detecting the position of the workpiece, based on a result of image pickup; and
a robot picking up the workpiece placed in the vibration generating device, based on a result of detection by the vision unit,
the vibration generating device comprising:
a trough where the workpiece is placed;
a first vibration motor and a second vibration motor whose rotary shafts are laid along a horizontal direction and parallel to each other;
a transmission unit where the first vibration motor and the second vibration motor are arranged and that transmits a vibration of the first vibration motor and the second vibration motor to the trough;
a first sensor detecting a rotating position of the rotary shaft of the first vibration motor; and
a second sensor detecting a rotating position of the rotary shaft of the second vibration motor.

* * * * *